(12) United States Patent
Beer

(10) Patent No.: US 11,939,898 B2
(45) Date of Patent: Mar. 26, 2024

(54) EXHAUST SYSTEM OF AN INTERNAL COMBUSTION ENGINE

(71) Applicant: Volkswagen Aktiengesellschaft, Wolfsburg (DE)

(72) Inventor: Sascha Beer, Schwuelper (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/748,797

(22) Filed: May 19, 2022

(65) Prior Publication Data

US 2022/0372906 A1 Nov. 24, 2022

(30) Foreign Application Priority Data

May 20, 2021 (DE) .................... 10 2021 113 203.7

(51) Int. Cl.
*F01N 13/00* (2010.01)

(52) U.S. Cl.
CPC ...... *F01N 13/008* (2013.01); *F01N 2560/025* (2013.01); *F01N 2560/026* (2013.01); *F01N 2560/12* (2013.01)

(58) Field of Classification Search
CPC ............ F01N 13/008; F01N 2560/025; F01N 2560/026; F01N 2560/12; F01N 2240/20; F01N 2260/14; F01N 2560/02; F01N 13/08; F01N 3/2892
See application file for complete search history.

(56) References Cited

U.S. PATENT DOCUMENTS

| | | | |
|---|---|---|---|
| 4,903,481 A | 2/1990 | Schuster et al. | |
| 10,746,079 B2 | 8/2020 | Okamoto | |
| 2007/0204597 A1 | 9/2007 | Nakano | |
| 2010/0071352 A1* | 3/2010 | Tatur | B01F 23/10 60/287 |
| 2013/0199371 A1* | 8/2013 | Gyuro | F01N 3/0253 95/278 |
| 2017/0107877 A1* | 4/2017 | Johnson | F01N 9/00 |
| 2017/0350335 A1* | 12/2017 | Muramatsu | F01N 3/24 |
| 2017/0363017 A1* | 12/2017 | Nakata | F02D 41/0255 |
| 2019/0162103 A1* | 5/2019 | Okamoto | F01N 3/2892 |
| 2019/0323397 A1* | 10/2019 | Pill | F01N 3/2892 |

FOREIGN PATENT DOCUMENTS

| | | |
|---|---|---|
| DE | 37 43 295 C1 | 7/1988 |
| DE | 102013007523 A1 | 11/2014 |
| DE | 102018220131 A1 | 5/2019 |
| DE | 2018 203 936 A1 | 9/2019 |
| EP | 3767086 A1 | 1/2021 |
| JP | 2007-247560 A | 9/2007 |
| JP | 2016-121652 A | 7/2016 |

* cited by examiner

*Primary Examiner* — Matthew T Largi
(74) *Attorney, Agent, or Firm* — Muncy, Geissler, Olds & Lowe, P.C.

(57) ABSTRACT

An exhaust system for an internal combustion engine, in the exhaust duct of which a sensor is arranged for determining the exhaust gas composition. Furthermore, upstream of the sensor a guide vane is arranged, which is designed to increase the flow velocity of the exhaust gas in a local flow cross-section of the exhaust duct at the height of the sensor. This makes it possible to provide sufficiently high flow velocities of the exhaust gas at the sensor.

11 Claims, 4 Drawing Sheets

EXHAUST SYSTEM OF AN INTERNAL COMBUSTION ENGINE

This nonprovisional application claims priority under 35 U.S.C. § 119(a) to German Patent Application No. 10 2021 113 203.7, which was filed in Germany on May 20, 2021, and which is herein incorporated by reference.

BACKGROUND OF THE INVENTION

Field of the Invention

The present invention relates to an exhaust system of an internal combustion engine in a vehicle comprising an exhaust duct and an exhaust gas aftertreatment system.

Description of the Background Art

The efficient operation and low emissions of motor vehicles are subject to continuous analysis and consideration in order to reduce fuel consumption and exhaust emissions. Raw emissions are significantly reduced by internal engine measures and intelligent engine control concepts as well as emissions emitted into the environment by improved exhaust gas aftertreatment systems. An important part of achieving this goal is the control of combustion in the vehicle's internal combustion engine. By-products produced mainly during the combustion of the air-fuel mixture are the pollutants $NO_x$, CO, and HC. The amounts of these pollutants contained in the raw exhaust gas depend heavily on the combustion process and engine operation. A quantity that has a significant influence on the formation of pollutants is the air-fuel ratio $\lambda$. The correct air-fuel ratio—also known as the lambda ratio—is an important parameter for controlling combustion and also for enabling exhaust gas purification by catalysts. In addition, there are other criteria that influence the air-fuel ratio.

In a gasoline engine, by definition, an air-fuel ratio equal to 1 is present if the air mass supplied corresponds exactly to the theoretically required air mass for the complete stoichiometric combustion of the supplied fuel. In most operating ranges, engines are operated with a stoichiometric air-fuel mixture ($\lambda=1$). If this is the case, for example, a three-way catalyst can develop its best possible cleaning effect. An air-fuel ratio less than 1 is chosen to form a rich air-fuel mixture. This is done, among other things, to protect components in the exhaust system from excess temperature, e.g., during long full load journeys. Finally, it is possible to choose an air-fuel ratio greater than 1. In this area there is excess air, and the result is a lean air-fuel mixture. This is chosen, for example, during cold start in order to be able to convert the HC engine-out emissions effectively and quickly with sufficient oxygen.

Diesel engines operate with excess air. Therefore, the three-way catalyst cannot be used for $NO_x$ reduction, since in lean diesel exhaust the HC and CO emissions at the catalyst preferably react with the residual oxygen from the exhaust gas and not with $NO_x$. The removal of HC and CO emissions from the diesel exhaust gas is carried out by an oxidation catalyst. The removal of nitrogen oxides is possible with an $NO_x$ adsorber or an SCR catalyst (Selective Catalytic Reduction). The removal of soot particles is carried out with the help of soot particle filters. In order to use these measures efficiently, the air-fuel ratio is varied at times. An $NO_x$ adsorber stores nitrogen oxides and must therefore be regenerated after a certain period of time or intake. For this purpose, there must be a lack of air in the exhaust gas, since the substances CO, $H_2$ and various hydrocarbons present in the exhaust gas serve as reducing agents.

Obviously, the raw pollutant emissions of an engine are essentially determined by the air-fuel ratio (lambda number $\lambda$). Therefore, an accurate and reliable measurement of this quantity is of paramount importance. Only by accurately measuring and determining the air-fuel ratio can the fuel mixture necessary for the respective operation be set.

Lambda sensors—also called lambda probes—are used for this purpose, where a distinction is made between bistable probes and linear probes (wide-band probes). The bistable probes allow for the stoichiometric fuel-air ratio to be regulated by an air-fuel ratio equal to 1, as they detect the transition from one area to the other. Wide-band probes, on the other hand, measure both in the rich and lean ranges.

The lambda probe measures the residual oxygen content of the exhaust gas and transmits the value to the engine control unit as an electrical voltage. Based on the lambda probe voltage, the control unit detects the composition of the mixture and can adjust the combustion air ratio.

Lambda probes can be constructed differently. What all versions have in common, however, is that they are surrounded by the exhaust gas to be measured. To protect sensitive elements, a thermowell is attached to the probe housing on the exhaust side. This protects the sensor element from combustion residues and condensation in the exhaust gas. For gas access, the thermowell is provided with holes. Accordingly, it is of great importance that even with the thermowell, sufficient contact of the measuring elements with the exhaust gas can take place.

It may also be important to monitor nitrogen oxide emissions for efficient exhaust gas aftertreatment. This can be done by $NO_x$ sensors. These are used, among other things, to control the amount of urea dosed into systems for selective catalytic reduction (SCR) for $NO_x$ reduction and for monitoring (on-board diagnostics) of SCR components. The sensor also allows for monitoring of an $NO_x$ adsorber. $NO_x$ sensors also include a ceramic sensor element that works according to the amperometric double-chamber principle and is protected by a thermowell.

JP 2016-121652 A describes an internal combustion engine with a connected exhaust manifold. Starting from the cylinder head, the exhaust gas paths of the respective cylinders are connected via openings to corresponding exhaust pipes of the exhaust manifold and ultimately lead into an exhaust collector pipe of the manifold, where a lambda probe is arranged. A gasket is arranged between the exhaust manifold and the cylinder head. In the area of the exhaust gas paths, the gasket includes protrusions that protrude into the openings and direct the exhaust gas towards the lambda probe.

DE 37 43 295 C1, which corresponds to U.S. Pat. No. 4,903,481, describes a gas baffle which is arranged in the direction of flow of an exhaust gas in front of a lambda probe. The gas baffle is arranged in such a way that it creates a slipstream for the lambda probe.

JP 2007-247560 A describes an internal combustion engine with an exhaust gas turbocharger. For boost pressure control, a bypass line (also called wastegate) is arranged downstream of the combustion engine and upstream of the turbine of the exhaust gas turbocharger, starting from an exhaust pipe. The bypass line has a bypass valve that adjusts the amount of exhaust gas supplied to the turbine. Downstream of the bypass line and upstream of an exhaust gas catalyst, a sensor is additionally arranged. After a cold start, the bypass valve is opened to quickly heat the sensor to its operating temperature. In order for the exhaust gas to flow around the sensor, a guide is arranged in the downstream region of the bypass line. These are fins that are arranged on the bypass valve. Alternatively, the guide is modeled after the convex shape of the exhaust duct, which, in other words, is narrowed at the said point. The guide unfolds its effect when the bypass valve is open, so that the flow passes the point where the guide is present.

Furthermore, concepts are applied that are based on a reduction of the flow cross-section to ensure sufficient flow velocities of the exhaust gas on a lambda probe—especially during operation in partial load ranges. This is done by constricting or reducing the cross-section of the exhaust duct in the region of a Lambda probe. However, this increases the exhaust gas back pressure due to the increased flow resistance.

SUMMARY OF THE INVENTION

It is therefore an object of the present invention to provide an exhaust system for an internal combustion engine of a vehicle, which at least partially overcomes the said disadvantages of the prior art and ensures that gas sensors for determining the gas composition used in the exhaust systems provide accurate and reliable measured values.

The exhaust system according to an exemplary embodiment of the invention for an internal combustion engine of a vehicle comprises an exhaust duct and an exhaust gas aftertreatment system, wherein at least one sensor for determining the exhaust gas composition is arranged in the exhaust duct. Furthermore, a guide vane is arranged upstream of the sensor, wherein the guide vane is designed to increase the flow velocity of the exhaust gas in a local flow cross-section of the exhaust duct at the height of the sensor.

By increasing the flow velocity of the exhaust gas, the exhaust gas experiences acceleration. In particular, the flow velocity of the exhaust gas in a local flow cross-section of the exhaust duct increases by the exhaust system according to the invention at the height of the sensor. As explained above, sensors for determining the exhaust gas composition, which are arranged in the exhaust gas stream, include thermowells that are intended to protect the sensors from combustion residues and water hammer. The thermowells have openings through which the exhaust gas can enter the thermowells. As a result, a sufficiently high flow velocity of the exhaust gas on the thermowell of the sensors is desirable. The exchange velocity of the gas depends to a large extent on the mentioned flow velocity. Higher flow velocities increase the entry of the exhaust gas into the measuring volume, which is formed by the thermowell of the sensors, and replaces exhaust gas that has already been in the volume for a certain residence time. This exchange also has a direct effect on the measuring element of the sensors, as it shortens the response time of the sensors.

Accordingly, direct flow paths are ensured, and an increased momentum exchange of the gas molecules is promoted. Fast and intensive mixing of freshly incoming exhaust gas with exhaust gas, which is already inside the thermowell of the sensor, is made possible. This ensures an improved flow through the thermowell and furthermore, the residence time of exhaust gas in the thermowell is reduced. This improves the measurement accuracy and reliability of the sensor.

As a result, a sufficiently high flow velocity of the exhaust gas that flows around the sensors and is in contact with them is ensured. However, it must be taken into account that solely for this purpose an increase in the flow velocity for the described, local area around the sensor is sufficient and also desired. An increase in the flow velocity of the exhaust gas in further regions of the exhaust duct, in which the exhaust gas has no influence on the sensors and measurement accuracy of the sensor, does not contribute to the achievement of the object, but instead causes an increased exhaust gas back pressure by increasing the flow resistance.

The guide vane can be arranged upstream of the sensor. Furthermore, the guide vane is designed to increase the flow velocity of the exhaust gas in a local flow cross-section of the exhaust duct at the height of the sensor. This ensures that the flow velocity of the exhaust gas that flows around and is in contact with the sensor assumes sufficiently high values. As a result, it is achieved that the sensors provide accurate and reliable measured values. By means of the guide vane, the enthalpy contained in the exhaust gas that flows over the guide vane is converted either completely or partially into flow energy. The force to accelerate the fluid particles, the pressure gradient force and their work leads to an increase in the kinetic energy of the fluid particles. In other words, the exhaust gas is accelerated by the energy conversion. Due to the arrangement of the guide vane upstream of the sensor and its corresponding design, the flow velocity of the exhaust gas in the exhaust duct is thus increased at the height of the sensor. At the same time, this local restriction on the influence of the flow field of the exhaust gas ensures that the exhaust gas back pressure is only influenced to a small extent. In particular, this influence takes place exclusively where the exhaust gas flow influences the measurement. Other areas remain unaffected.

The flow cross-section of the exhaust duct at the height of the sensor may be constant. With respect to the guide vane according to the invention, constrictions in the area of the sensor customary in the prior art can thus be avoided. In addition to the efficient flow control, which is characterized by low exhaust gas back pressure, this also provides a space-saving solution, which makes structural adjustments of an entire section of the exhaust duct superfluous and therefore also represents a more economically cost-effective solution.

The sensor for determining the exhaust gas composition can be a lambda probe. The sensor for determining the exhaust gas composition can be an $NO_x$ sensor. What both types of sensors have in common is that they include sensitive measuring elements that require special protection provided by thermowells. In conjunction with the exhaust system according to the invention, these sensors enable an optimized operation of the combustion engine, which is ensured by an accurate and reliable measurement due to the sufficient high flow velocities. At the same time, the sensors are always protected by their design and thus have an increased service life without having a negative effect on their accuracy.

The guide vane can be designed to increase the flow velocity of the exhaust gas at the height of the sensor to at least 5 m/s, in particular to at least 7 m/s, preferably to at least 10 m/s. It has been shown that flow velocities from a value of 5 m/s and above this value can have a particularly positive influence on the measurement behavior of the sensors in terms of high measurement accuracy and fast response time.

Preferably, an angle between the guide vane and the exhaust duct can be variably adjusted by tilting or straightening the guide vane. This design makes it possible to take into account the actual flow behavior. An adjustment of this angle influences the extent of the pressure gradient force, which leads to an increase in the kinetic energy of the fluid particles of the exhaust gas. A possible variable angle is the angle between a surface of the guide vane, which is facing away from the sensor and overflowed in the direction of flow of the exhaust gas, and a surface of the exhaust duct, which is also facing away from the overflowed surface of the guide vane. Thus, different proportions of the enthalpy contained in the exhaust gas can be converted into flow energy. As a result, it is also possible to react to partial load ranges of the combustion engine. Thus, according to an operating point, an ideal flow velocity of the exhaust gas in the local flow cross-section of the exhaust duct can always be set at the height of the sensor.

The adjustment of the angle between the guide vane and the exhaust duct can be carried out as a function of the current flow velocity of the exhaust gas upstream of the sensor. This makes it possible to determine very precisely and concretely whether the exhaust gas has a sufficiently high flow speed so that the sensor determines reliable measured values. If there is too low a flow velocity, a progressive acceleration of the exhaust gas can be achieved by increasing the angle, so that a suitable flow velocity of the exhaust gas is present when it flows around the sensor. Conversely, the angle can be reduced in the event of a flow velocity of the exhaust gas that is sufficiently high or too high. As a result, the pressure loss can be reduced to a minimum value defined by the minimum necessary flow velocity of the exhaust gas at the height of the sensor.

The flow velocity can be calculated using a model or measured by a flowmeter. In both cases, it is possible to draw precise conclusions regarding the flow velocity of the exhaust gas upstream of the sensor.

Alternatively, the adjustment of the angle between the guide vane and the exhaust duct can be determined as a function of a plausibility check. Among other things, the lambda probe signal or the measured values from the lambda probe are checked for plausibility. If values are detected that do not meet plausibility criteria, for example because they fall outside a tolerance range of an expected measuring range determined on the basis of a model, the angle between the guide vane and the exhaust duct can be adjusted based on this. Preferably, an OSC measurement of the exhaust gas catalyst can also be carried out, on the basis of which the oxygen storage capacity of the exhaust gas catalyst is tested. Measured values of the lambda probe are influenced by the oxygen storage capacity of the exhaust gas catalyst, so that a conclusion regarding the plausibility of the measured values can also be made on the basis of the OSC measurement.

Two side edges of the guide vane extending in the flow direction can protrude in the direction of the center axis and a surface of the guide vane overflowed by the exhaust gas is channel-shaped. Such a surface shape further optimizes the inflow profile of the exhaust gas flow and further increases the inflow velocity at the sensor.

A surface of the guide vane extending along the flow direction and overflowed by the exhaust gas can rise ramp-like in the flow direction of the exhaust gas and in the direction of the center axis of the exhaust duct. This provides a guide vane with a surface shape that further improves the acceleration of the exhaust gas.

The previously mentioned examples can be combined particularly advantageously with each other. The flow field in the mostly tubular exhaust duct can thus be influenced particularly effectively, since the flow can be influenced in several dimension axes, this being at least one axis along the flow direction of the exhaust gas and also a dimension axis perpendicular to the flow direction.

Preferably, the guide vane can be connected to the exhaust duct in a form- or material-locking manner. As a result, various suitable measures can be used for fastening, and the location of the guide vane can be flexibly selected. Furthermore, these are space-saving mechanisms that can be suitably adjusted to the location of the sensors and are decoupled from other components of the exhaust system.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
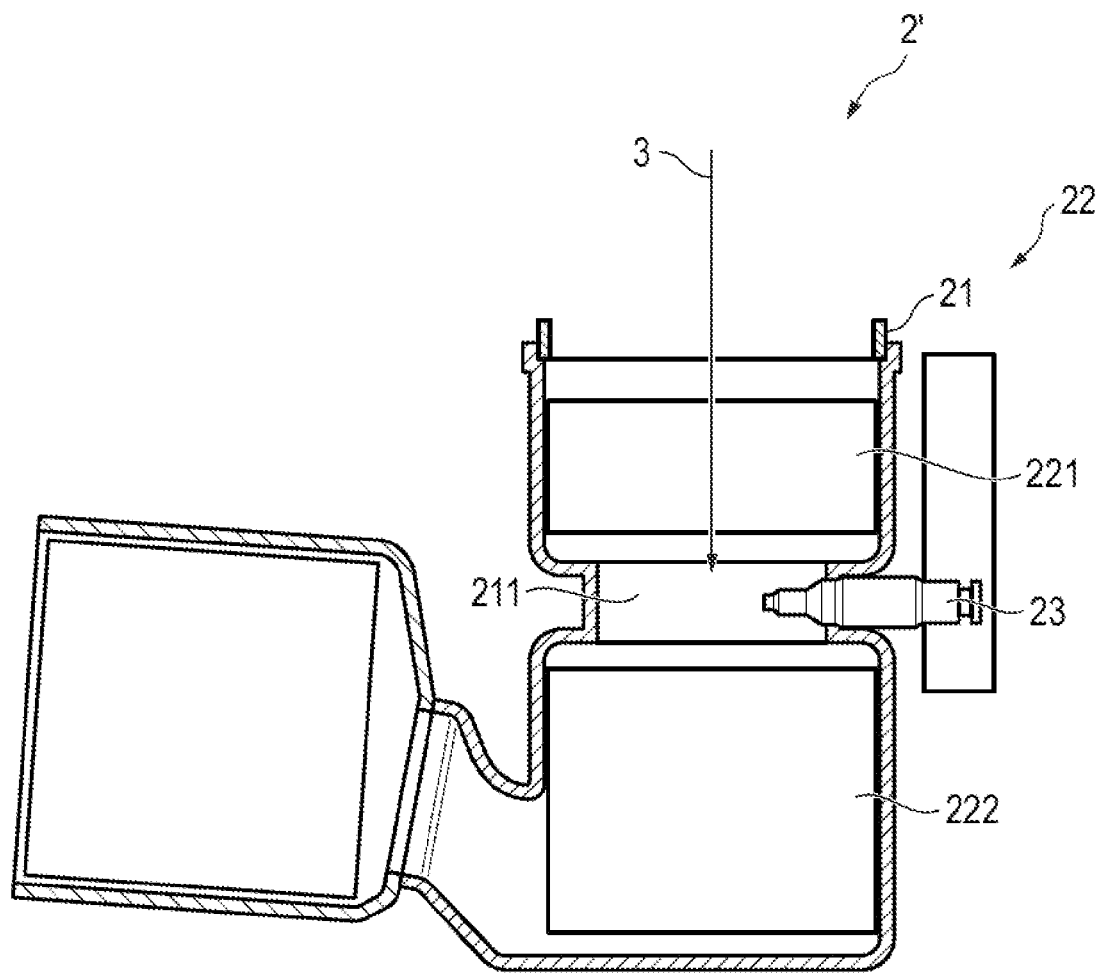
FIG. 1 illustrates an exhaust system according to the conventional art in a schematic view.

FIG. 1 shows an exhaust system 2' according to the conventional art, which is arranged downstream of a not-shown internal combustion engine of a vehicle. The connection to the combustion engine is made via an exhaust duct 21. Downstream of the internal combustion engine, a first catalyst 221 is arranged. Downstream of this is a lambda probe 23, whose measuring head protrudes into the exhaust duct 21, whereby it is surrounded by the exhaust gas 3 (represented by an arrow, which also represents the flow direction of the exhaust gas) and measures the residual oxygen concentration in the exhaust gas 3. Also downstream of the first catalyst 221, a second catalyst 222 is arranged. The catalysts 221, 222 are used to reduce exhaust emissions and are part of the exhaust aftertreatment system 22. All the components mentioned above, which carry exhaust gas 3, are in flow connection to each other via an exhaust duct 21 that is not further subdivided.

The section 211 of the exhaust duct 21 which lies between the catalysts 221 and 222 and in which the lambda probe 23 is arranged has a reduced flow cross-section. This is done with the aim of increasing the flow velocity of the exhaust gas 3 in the constricted section 211 of the exhaust duct 21, so that the lambda probe 23 arranged there provides reliable measured values about the oxygen concentration in the exhaust gas 3. However, this flow influence affects the entire area within this section 211 of the exhaust duct 21. As a result, the flow resistance also increases, which results in an increased pressure loss and thus in increasing exhaust gas back pressure.

Figure 2:
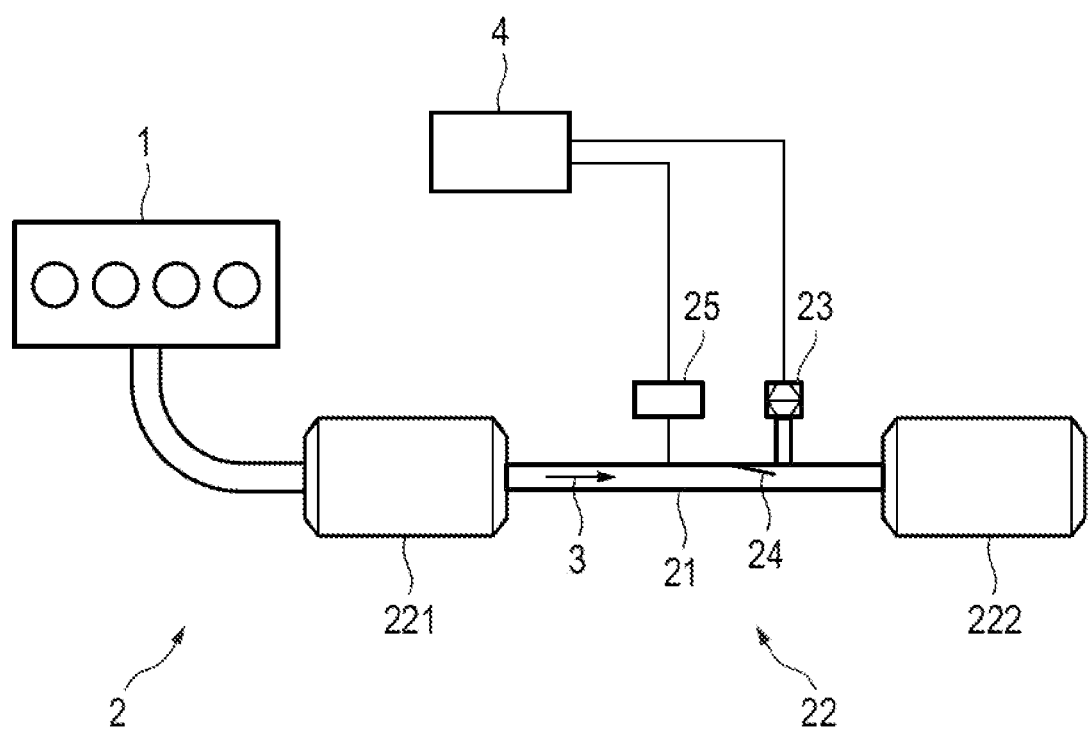
FIG. 2 illustrates a system structure according to the invention.

FIG. 2 shows an inventive system structure according to an embodiment of the present invention. Shown is an exhaust system 2, which is arranged downstream of an internal combustion engine 1 of a vehicle. Downstream of the internal combustion engine 1 is a first catalyst 221, which in this example is designed as a three-way catalyst. Downstream of the latter is a flowmeter 25 for measuring the exhaust gas mass flow. Following the flowmeter 25 is a lambda probe 23, which protrudes into the exhaust duct 21, whereby the lambda probe 23 is surrounded by the exhaust gas 3 (represented by an arrow, which also represents the flow direction of the exhaust gas) and measures the residual oxygen concentration 3 in the exhaust gas. Downstream of the lambda probe 23 is a second catalyst 222, which in this example is also designed as a three-way catalyst. The exhaust aftertreatment system 22 includes the catalysts used to reduce exhaust emissions. All the components mentioned above, which carry exhaust gas 3, are in flow connection with each other via an exhaust duct 21 that is not further subdivided.

Furthermore, upstream of the lambda probe 23, a guide vane 24 is arranged. The guide vane 24 is designed to increase the flow velocity of the exhaust gas in a local flow cross-section of the exhaust duct 21 at the height of the sensor. The flow cross-section of the exhaust duct 21 flowed through by exhaust gas 3 remains constant in the region of the lambda probe 23. There is no constriction in the region of the lambda probe 23.

In addition, the vehicle comprises an on-board computer, i.e., an engine control unit 4. This is used, among other things, for the preparation and evaluation of the signals, which are transmitted, among other things, by the lambda probe 23 and the flowmeter 25.

Figure 3:
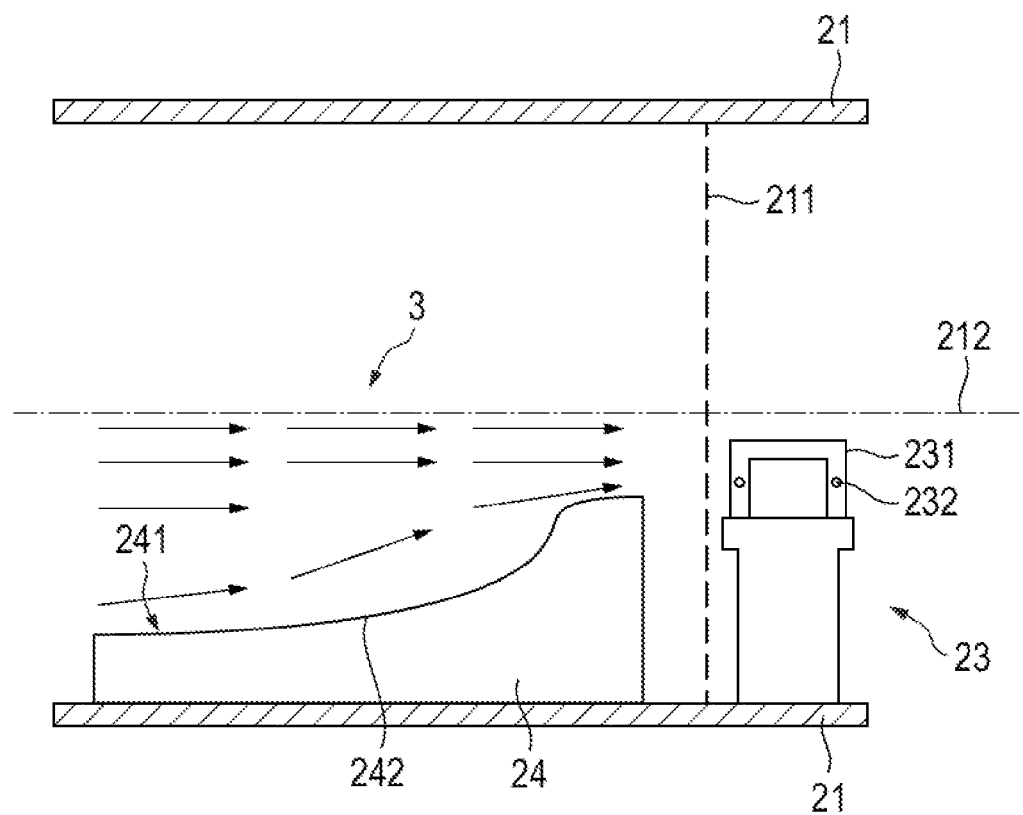
FIG. 3 illustrates a side view of an exhaust duct section according to the example of the invention shown in FIG. 2 rotated by 180° along its center axis.

FIG. 3 shows a side view of an exhaust duct section of the exhaust duct 21 according to the embodiment of the invention shown in FIG. 2 rotated by 180° along its center axis 212. It is the exhaust duct section on which the lambda probe 23 is arranged. To protect sensitive elements, a thermowell 231 is attached to the probe housing on the exhaust side. This protects the sensor element from solid combustion residues and condensation in the exhaust gas 3. For gas access, the thermowell 231 has inlet holes 232.

Upstream of the lambda probe 23, the guide vane 24 is arranged, which is connected to the exhaust duct 21, wherein it is attached directly to the duct wall. Two side edges 242 of the guide vane extending in the flow direction protrude in the direction of the center axis 212. A surface 241 of the guide vane 24 overflowed by the exhaust gas 3 is channel-shaped. In other words, there is a curvature of the overflowed surface 241, which is channel-shaped in a perspective oriented in the direction of flow of the exhaust gas 3. Furthermore, the surface 241 of the guide vane 24, which extends along the flow direction and is overflowed by the exhaust gas 3, rises ramp-like in the flow direction of the exhaust gas 3 and in the direction of the center axis 212 of the exhaust duct 21. In other words, the distance between the center axis 212 and the overflowed surface 241 decreases in the flow direction. Preferably, the surface 241 rises such that it has a curvature that comes close to a concave shape.

The guide vane 24 causes the exhaust gas 3 illustrated by arrows to experience an acceleration that is locally limited only to the flow velocity of the exhaust gas 3 at the height of the lambda probe 23. This favors an entry of the exhaust gas through the holes 232 of the thermowell 231 of the lambda probe 23 into the measuring volume. Nevertheless, the flow cross-section 211 of the exhaust duct 21 remains unchanged, so that the exhaust gas back pressure does not increase as a result of constriction of the exhaust duct 21. In addition, no structural and expensive measures to change the exhaust duct geometry are necessary.

Figure 4:
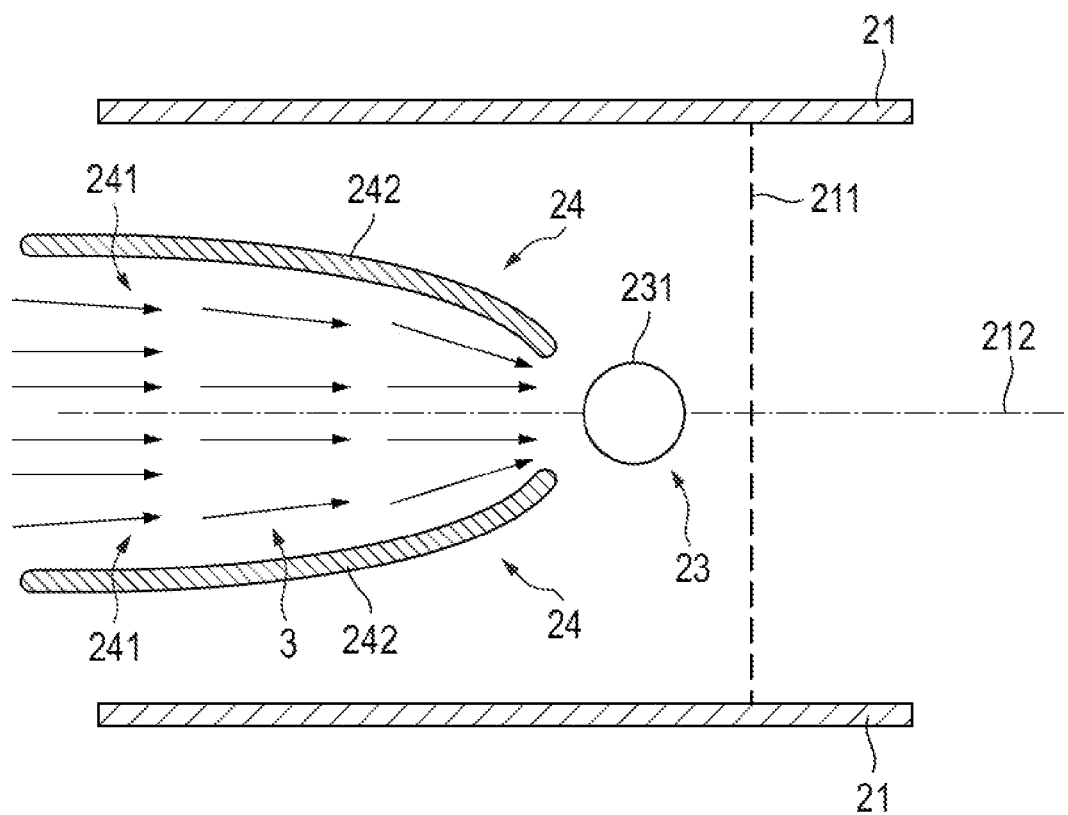
FIG. 4 illustrates a view of the top of the guide vane and the lambda probe of an exhaust duct section according to the example of the invention shown in FIG. 2.

FIG. 4 shows a view of the top of the lambda probe 23 and the guide vane 24 of the exhaust duct section according to FIG. 2. The perspective on the exhaust duct section was therefore rotated by 90° about the center axis 212 as compared to the view in FIG. 3, so that now a view of the top of the lambda probe 23 and the guide vane 24 is shown. The described surface 241 causes a significant deflection of the exhaust gas 3. Combined, therefore, both the protruding side edges 242 of the guide vane 24, the channel-shaped surface 241 and its ramp-like rise cause a deflection of the exhaust gas in several directional axes, so that a particularly pronounced acceleration can take place.

In an advantageous design, the guide vane 24 is adjustable, so that, among other things, an angle between the surface of the guide vane 24 facing away from the lambda probe 23 in FIG. 4 and a surface of the exhaust duct 21 facing this surface can be varied. As a result, the strength of the acceleration and thus the flow velocity of the exhaust gas 3 can be adjusted at the height of the lambda probe. This makes it possible to react optimally to different operating states and consequently to allow for a minimum pressure loss at a sufficiently high flow velocity. The setting can be specified by an engine control unit 4, wherein a flow velocity measured with the flowmeter 25 upstream of the lambda probe 23 serves as a basis for calculation. Alternatively, a flowmeter could be dispensed with, and the flow velocity could be determined on the basis of a model. The engine control unit 4 usually models the air volume on the basis of which the flow velocity of the exhaust gas 3 could be calculated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An exhaust system for an internal combustion engine of a vehicle, the exhaust system comprising:
    an exhaust duct;
    an exhaust aftertreatment system;
    at least one sensor arranged in the exhaust duct to determine an exhaust gas composition of the exhaust gas; and
    a guide vane arranged upstream of the at least one sensor, the guide vane configured to increase a flow velocity of the exhaust gas in a local flow cross-section of the exhaust duct at a height of the at least one sensor,
    wherein the guide vane has a first end and a second end, the second end being positioned closer to the at least one sensor than the first end and, with respect to a flow direction of the exhaust gas, the second end is positioned farther downstream than the first end,
    wherein an upper surface of the guide vane extending between the first end and the second end along the flow direction of the exhaust gas and overflowed by the exhaust gas rises ramp-like in the flow direction, the rise of the upper surface being in a direction towards a center axis of the exhaust duct, such that a height of the guide vane at the second end is greater than a height of the guide vane at the first end, and
    wherein the guide vane has a bottom surface that opposes the upper surface, the bottom surface of the guide vane being attached to an inner surface of the exhaust duct, and wherein the height of the guide vane at the first and second ends of the guide vane is a distance between the bottom surface and the upper surface at each of the first and second ends.

2. The exhaust system according to claim 1, wherein the local flow cross-section of the exhaust duct at the height of the at least one sensor is constant.

3. The exhaust system according to claim 1, wherein the at least one sensor for determining the exhaust gas composition is a lambda probe and/or an NOx sensor.

4. The exhaust system according to claim 1, wherein the guide vane is designed to increase the flow velocity of the exhaust gas at the height of the at least one sensor to at least 5 m/s.

5. The exhaust system according to claim 1, wherein, by tilting or straightening the guide vane, an angle between the guide vane and the exhaust duct is variably adjustable.

6. The exhaust system according to claim 5, wherein the adjustment of the angle between the guide vane and the exhaust duct is carried out as a function of the flow velocity of the exhaust gas at the height of the at least one sensor.

7. The exhaust system according to claim 6, wherein the flow velocity is calculated via a model or measured by a flowmeter.

8. The exhaust system according to claim 1, wherein two side edges of the guide vane extending in the flow direction curve in the direction of the center axis and the upper surface of the guide vane overflowed by the exhaust gas is channel-shaped.

9. The exhaust system according to claim 1, wherein the guide vane is connected to the exhaust duct in a form- or material-locking manner.

10. The exhaust system according to claim 1, wherein two side edges of the guide vane, that form side surfaces of the guide vane, are curved in the flow direction of the exhaust gas, the two side edges being curved in a direction towards the at least one sensor.

11. The exhaust system according to claim 10, wherein a second guide vane is provided, the guide vane and the second guide vane being spaced apart from one another and each being curved towards one another so as to form a channel therebetween that extends in the flow direction towards the at least one sensor.

\* \* \* \* \*